United States Patent
Zhao et al.

(10) Patent No.: US 10,239,045 B2
(45) Date of Patent: Mar. 26, 2019

(54) INORGANIC COMPOSITE OXIDES AND METHODS OF MAKING THE SAME

(71) Applicant: RHODIA OPERATIONS, Paris (FR)

(72) Inventors: Qiang Zhao, Yardley, PA (US); Barry W. L. Southward, Philadelphia, PA (US); Francis Francis, Columbia, MD (US); Fabien Ocampo, La Courneuve (FR)

(73) Assignee: Rhodia Operations, Paris (FR)

( * ) Notice: Subject to any disclaimer, the term of this patent is extended or adjusted under 35 U.S.C. 154(b) by 77 days.

(21) Appl. No.: 15/106,486

(22) PCT Filed: Dec. 23, 2014

(86) PCT No.: PCT/US2014/072179
§ 371 (c)(1),
(2) Date: Jun. 20, 2016

(87) PCT Pub. No.: WO2015/100339
PCT Pub. Date: Jul. 2, 2015

(65) Prior Publication Data
US 2017/0001173 A1    Jan. 5, 2017

Related U.S. Application Data

(60) Provisional application No. 61/920,183, filed on Dec. 23, 2013.

(51) Int. Cl.
*B01D 53/94* (2006.01)
*B01J 23/10* (2006.01)
(Continued)

(52) U.S. Cl.
CPC .............. *B01J 23/10* (2013.01); *B01D 53/94* (2013.01); *B01J 35/1014* (2013.01);
(Continued)

(58) Field of Classification Search
None
See application file for complete search history.

(56) References Cited

U.S. PATENT DOCUMENTS

2008/0096760 A1* 4/2008 Darab ................... B01J 23/002
502/303
2011/0183840 A1 7/2011 Darab
(Continued)

FOREIGN PATENT DOCUMENTS

EP         1 172 139 A1    1/2002

*Primary Examiner* — Melvin C. Mayes
*Assistant Examiner* — Michael Forrest (57) ABSTRACT

Described herein are methods for forming inorganic composite oxides. Such methods include combining, at a substantially constant pH of between about 5 and about 6.75 over a period of at least about 5 minutes, an acidic precursor composition and a basic composition to form a precipitate composition, wherein the acidic precursor composition comprises an alumina precursor, a ceria precursor, a zirconia precursor and optionally one or more dopant precursors; stabilizing the precipitate by increasing the pH of the precipitate composition to between about 8 and about 10; and calcining the stabilized precipitate to form an inorganic composite oxide. Also described are inorganic composite oxides formed using such methods.

19 Claims, 2 Drawing Sheets

(51) Int. Cl.
- *B01J 35/10* (2006.01)
- *B01J 37/00* (2006.01)
- *B01J 37/03* (2006.01)
- *B01J 37/04* (2006.01)
- *B01J 37/06* (2006.01)
- *B01J 37/08* (2006.01)
- *C01B 13/36* (2006.01)
- *C01G 25/00* (2006.01)
- *C04B 35/111* (2006.01)
- *C04B 35/117* (2006.01)
- *C04B 35/119* (2006.01)

(52) U.S. Cl.
CPC ....... *B01J 35/1038* (2013.01); *B01J 37/0045* (2013.01); *B01J 37/031* (2013.01); *B01J 37/04* (2013.01); *B01J 37/06* (2013.01); *B01J 37/08* (2013.01); *C01B 13/363* (2013.01); *C01G 25/006* (2013.01); *C04B 35/111* (2013.01); *C04B 35/117* (2013.01); *C04B 35/119* (2013.01); *B01J 2523/00* (2013.01); *C01P 2002/60* (2013.01); *C01P 2004/61* (2013.01); *C01P 2006/13* (2013.01); *C01P 2006/14* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01)

(56) References Cited

U.S. PATENT DOCUMENTS

| | | |
|---|---|---|
| 2012/0129690 A1* | 5/2012 | Larcher .................. B01J 21/12 502/304 |
| 2013/0017947 A1 | 1/2013 | Schermanz et al. |
| 2013/0023410 A1 | 1/2013 | Schoneborn et al. |
| 2013/0108530 A1 | 5/2013 | Chang et al. |

* cited by examiner

INORGANIC COMPOSITE OXIDES AND METHODS OF MAKING THE SAME

RELATED APPLICATIONS

This application is a U.S. national stage entry under 35 U.S.C. § 371 of International Application No. PCT/US2014/072179 filed Dec. 23, 2014, which claims the priority of U.S. Provisional Application No. 61/920,183 filed Dec. 23, 2013. The entire contents of these applications are explicitly incorporated herein by this reference.

BACKGROUND

Internal combustion engines produce exhaust containing by-products that present known health hazards to human beings, animals and plant life. Pollutants include, for example, unburnt hydrocarbons, carbon monoxide (CO), oxides of nitrogen (NOx) and other residual species, e.g., sulfur-containing compounds. Emission of these pollutants is, to a certain extent, controlled by exhaust catalysts. To be suitable for use, e.g., in vehicle applications, such catalysts must meet stringent requirements with respect to activity (light-off), effectiveness (e.g., responsive to fluctuating exhaust conditions), long-term activity, mechanical integrity, as well as cost effectiveness. Unburnt hydrocarbon, CO and NOx oxide pollutants have been successfully treated using the so-called 'three-way' catalyst. These noble metal containing catalysts are capable of converting a high percentage of pollutants into the less harmful products of carbon dioxide, water (steam) and nitrogen. For example, DE-05 38 30 318 describes the use of noble metals, typically metals of the platinum group, such as platinum, palladium, rhodium and mixtures thereof, as catalytic metals which can effectively convert unburnt hydrocarbons, CO, and NOx oxide pollutants under varying conditions encountered.

In practice, the noble metal is typically supported on a high surface area inorganic oxide, such as alumina. Nanocrystalline alumina is often used as a catalyst support due to its high specific surface area and good thermal resistance to coarsening and sintering at elevated temperatures. The alumina is typically applied or "washcoated" onto a ceramic or metallic substrate, such as in the form of a honeycomb monolith, a wire mesh, or similar structure. The noble metal may be associated with the alumina before washcoating or, alternatively, the noble metal may be applied to the alumina after the alumina has been washcoated.

Other catalyst systems use mixed metal oxides, often also including alumina, as noble metal supports. For example, EP 2 036 606 and EP 2 036 607 describe inorganic oxides comprising aluminum oxide, a metal oxide that does not form a composite oxide with aluminum oxide and at least one additional element selected from rare earth elements and alkaline earth elements. In addition, U.S. Pat. No. 6,335,305 discloses a catalyst that comprises an inorganic oxide support and a noble metal loaded on the support, wherein the support comprises a porous oxide and a composite oxide of the formula $(Al_2O_3)_a(CeO_2)_b(ZrO_2)_{1-b}$, wherein a is from 0.4 to 2.5 and b is from 0.2 to 0.7.

SUMMARY

Despite the fact that oxides of alumina, ceria and zirconia (ACZ) are presently used in automobile applications, there remains a need, not only to find the ACZ oxide structure that will provide ideal catalytic properties, but also find a method for producing this ACZ oxide. Unfortunately, processes for producing such oxides are highly complex and the properties of the resultant oxides are particularly dependent upon the method used for production. And structural features that enhance one catalytic property may deteriorate another. Thus, postulating that a given oxide structure will provide optimal properties remains somewhat speculative, and by itself provides little guidance on how to attain such an oxide. The present teachings are based, at least in part, on new methods for forming inorganic composite oxides that produce ACZ oxides with a high surface area, a uniform distribution of a ceria-zirconia composite on the surface of the alumina, and good ceria-zirconia phase stability at elevated temperatures.

Accordingly, in certain aspects the present teachings provide methods for forming an inorganic composite oxide. The method generally includes:

combining, at a substantially constant pH of between about 5 and about 6.75 over a period of at least about 5 minutes, an acidic precursor composition and a basic composition to form a precipitate composition, wherein the acidic precursor composition comprises an alumina precursor, a ceria precursor, a zirconia precursor and optionally one or more dopant precursors;

stabilizing the precipitate by increasing the pH of the precipitate composition to between about 8 and about 10; and calcining the stabilized precipitate to form an inorganic composite oxide.

In some embodiments, the substantially constant pH is maintained by controlling a flow rate of the acidic precursor composition, the basic composition or both. In some embodiments, the substantially constant pH is maintained by controlling a concentration of the acidic precursor composition, the basic composition or both.

In some embodiments, the acidic precursor composition and the basic composition are combined at a substantially constant pH of between about 5.5 and about 6.5 over a period of between about 5 and about 120 minutes. In some embodiments, the acidic precursor composition and the basic composition are combined at a substantially constant pH of between about 5.5 and about 6.5 over a period of between about 30 and about 90 minutes. In some embodiments, the acidic precursor composition and the basic composition are combined at a substantially constant pH of about 6.5 over a period of between about 5 and about 120 minutes. In some embodiments, the acidic precursor composition and the basic composition are combined at a substantially constant pH of about 6.5 over a period of between about 30 and about 90 minutes.

In some embodiments, the pH of the precipitate composition in the combining step does not vary by more than about 0.25. In some embodiments, the pH of the precipitate composition in the combining step does not vary by more than about 0.1.

In some embodiments, the acidic precursor composition and the basic composition are combined at a temperature of between about 50° C. and about 200° C. In some embodiments, the precipitate is stabilized by increasing the pH of the precipitate composition to between about 8 and about 9. In some embodiments, the precipitate is calcined at a temperature between about 600 and about 1100° C. for a time period of between about 2 and about 4 hours.

In some embodiments, the method further includes heating the precipitate composition to a temperature of between about 50° C. and about 200° C. for a period of time of between about 15 minutes and about 6 hours.

In some embodiments, the precursor composition comprises one or more dopant precursors selected from yttrium precursor, lanthanum precursor, neodymium precursor, praseodymium precursor, gadolinium precursor, or mixtures thereof.

In some embodiments, the inorganic composite oxide has, after calcining at 900° C. for 2 hours, a BET surface area of at least about 70 m²/g, a pore volume of at least about 0.45 cm³/g, or both. In some embodiments, the inorganic composite oxide, after aging at 1200° C. for 5 hours, exhibits minimal ceria-zirconia phase separation as measured by the absence of peak splitting in XRD. In some embodiments, the inorganic composite oxide has, after aging at 1100° C. for 5 hours, a surface area of at least about 30 m²/g, ceria-zirconia crystallites with a crystallite size of less than about 16 nm, or both.

In some embodiments, the inorganic composite oxide exhibits, after calcination at 900° C. for 2 hours, a maximum reducibility temperature of less than about 570° C., e.g., less than about 540° C., as measured by TPR with a 10° C./min temperature rise in a 30 mL/minute flow of 10% $H_2$ in argon. In some embodiments, the inorganic composite oxide exhibits, after calcination at 900° C. for 2 hours, an onset of ceria reducibility at a temperature of less than about 300° C., e.g., less than about 220° C., as measured by TPR with a 10° C./min temperature rise in a 30 mL/minute flow of 10% $H_2$ in argon. In some embodiments, the inorganic composite oxide exhibits, after calcination at 900° C. for 2 hours, a half-maximal TPR width measurement of less than about 75° C., e.g., less than about 60° C. or even less than about 50° C., as measured by TPR with a 10° C./min temperature rise in a 30 mL/minute flow of 10% $H_2$ in argon. In some embodiments, the inorganic composite oxide exhibits, after calcination at 900° C. for 2 hours, an absolute ceria reducibility of at least about 75%, e.g., at least about 85%, as measured by TPR with a 10° C./min temperature rise in a 30 mL/minute flow of 10% $H_2$ in argon.

In other aspects the present teachings also provide an inorganic composite oxide formed by the process described herein. For example, the present teachings provide a composite oxide represented by structure (I):

$$(Al_2O_3)_a(CeO_2)_b(ZrO_2)_c(M_xO_y)_d(M'_{x'}O_{y'})_e(M''_{x''}O_{y''})_f \quad (I)$$

wherein:
each of $M_xO_y$, $M'_{x'}O_{y'}$, $M''_{x''}O_{y''}$ is a binary oxide independently selected from $Y_2O_3$, $La_2O_3$, $Nd_2O_3$, $Pr_6O_{11}$, $Gd_2O_3$; and
coefficients a, b, c, d, e, and f reflect the respective molar amounts of the respective binary oxides, wherein:
35≤a≤97,
0≤b≤50,
0≤c≤60,
0≤d≤14,
0≤e≤14, and
0≤f≤14,
provided that:
no two of M, M', and M" are the same element, and
the sum of d+e+f is less than or equal to 14.

DETAILED DESCRIPTION

The present teachings are based, at least in part, on new co-precipitation methods for forming inorganic composite oxides, such as ACZ oxides. Simultaneous co-precipitation of multiple oxides is often contraindicated because of conflicting reaction conditions. For example, optimal conditions for precipitating alumina are very different than optimal conditions for precipitating ceria-zirconia. However, co-precipitation affords the potential for a product that is more homogeneous than a product formed via a conventional step-wise precipitation method. The present methods not only provide a means for co-precipitating multiple oxides to form an inorganic composite oxide, but also are capable of producing ACZ oxides with superior absolute ceria reducibility, better homogeneity and uniformity of ceria-zirconia on the alumina surface, and good ceria-zirconia phase stability at elevated temperatures, among other properties discussed herein.

Methods

The present teachings are directed, at least in part, to methods for forming inorganic composite oxides. Such methods include combining, at a substantially constant pH of between about 5 and about 6.75 over a period of at least about 5 minutes, an acidic precursor composition and a basic composition to form a precipitate composition, wherein the acidic precursor composition comprises an alumina precursor, a ceria precursor, a zirconia precursor and optionally one or more dopant precursors; stabilizing the precipitate by increasing the pH to between about 8 and about 10; and calcining the stabilized precipitate to form an inorganic composite oxide. As used herein, "inorganic composite oxide" means an inorganic oxide material that comprises at least two distinct crystallographic phases by X-ray diffraction. A flow diagram, which schematically represents an exemplary method for forming inorganic composite oxides, is provided in FIG. 1.

As used herein, the recitation of "over a period of at least about 5 minutes" refers to the time period taken for the physical act of combining the compositions. That is, excluded is the addition of the compositions to one another in the form of a bolus addition, followed by extended mixing. Although the methods of the present teachings do not exclude the possibility of extended mixing, the time period recited herein explicitly refers to the time taken to combine the acidic and basic compositions, and is not intended to include mixing time once combined. Typically this combination is accomplished by allowing the two compositions to gradually flow or drip into a reactor from separate starting vessels. In some embodiments, the methods of the present teachings use one or more pumps to control the flow of the acidic precursor composition and/or the basic precursor composition.

In some embodiments, the method includes combining the acidic precursor composition and the basic composition at a substantially constant pH of between about 5 and about 6.75 over a period of at least about 10 minutes, typically over a period of at least about 15 minutes, more typically over a period of at least about 20 minutes. In some embodiments, the method includes combining the acidic precursor composition and the basic composition at a substantially constant pH of between about 5.5 and about 6.5 over a period of at least about 5 minutes, typically over a period of at least about 10 minutes, more typically over a period of at least about 15 minutes, even more typically over a period of at least about 20 minutes.

In some embodiments, the method includes combining the acidic precursor composition and the basic composition at a substantially constant pH of between about 5.5 and about 6.5 over a period of between about 5 minutes and about 10 hours, typically over a period of between about 10 minutes and about 8 hours, more typically over a period of between about 15 minutes and about 6 hours, even more typically over a period of between about 20 minutes and about 5 hours. It is understood that all values and ranges between the cited ranges are intended to be encompassed by the present teachings. Accordingly, in some embodiments, the method includes combining the acidic precursor composition and the basic composition at a substantially constant pH of about 5, about 5.1, about 5.2, about 5.3, about 5.4, about 5.5, about 5.6, about 5.7, about 5.8, about 5.9, about 6, about 6.1, about 6.2, about 6.3, about 6.4 or about 6.5, over a period of about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 2 hours, about 3 hours, about 4 hours, about 5 hours or more. In some embodiments, the method includes combining the acidic precursor composition and the basic composition at a substantially constant pH of between about 5.5 and about 6.5 over a period of between about 5 minutes and about 120 minutes, typically over a period of between about 30 minutes and about 90 minutes. In other embodiments, the method includes combining the acidic precursor composition and the basic composition at a substantially constant pH of about 6.5 over a period of between about 5 minutes and about 5 hours. In other embodiments, the method includes combining the acidic precursor composition and the basic composition at a substantially constant pH of about 6.5 over a period of between about 5 minutes and about 120 minutes. In still other embodiments, the method includes combining the acidic precursor composition and the basic composition at a substantially constant pH of about 6.5 over a period of between about 30 minutes and about 90 minutes. In some embodiments, the time period is dependent upon the batch size.

As used herein, the term "substantially constant pH of between about 5 and about 6.75" refers to a pH that, within the confines of the "about 5 to about 6.75" range, does not vary by more than about ±0.5. That is, this language refers to a pH that does not vary by more than ±0.5 and does not fall below about 5 or exceed about 6.75. A substantially constant pH of between about 5.5 and about 6.5 refers to a pH selected between these two values that (a) does not vary by more than ±0.5 and (b) does not fall below about 5 or exceed about 6.75. As an illustrative example, a substantially constant pH of about 5.5 refers to a pH that would fall within the range of about 5 to about 6. However, a substantially constant pH of about 5.25, for purposes of the present teachings, refers to a pH that would fall within the range of about 5 to about 5.75. Similarly, a substantially constant pH of about 6.75 would refer, for purposes of the present teachings, to a pH that would fall within the range of about 6.25 to about 6.75. In some embodiments, the pH does not vary by more than 0.25. In other embodiments, the pH does not vary by more than 0.1.

The pH can be maintained, during the physical act of combining the compositions, in a number of ways. For example, pH can be maintained by controlling the flow rate of the acidic precursor composition, the basic composition or both. Additionally or alternatively, pH can be maintained by controlling the concentration of the acidic precursor composition, the basic composition or both. For example, if the target pH is 6.0, and the flow of acidic precursor composition and basic precursor composition is such that the pH of the mixture in the reaction vessel is nearing 6.5, the flow rate of the acidic precursor composition can be increased such that the pH of the mixture gradually decreases. Similarly, in the same situation, additional solvent (e.g., water) can be added to the basic composition to dilute it, again causing the pH of the mixture to gradually decrease to the target. A commercially available pH meter can be used to determine whether the pH is maintained at a substantially constant rate.

As used herein, the term "acidic precursor composition" refers to an aqueous mixture, that is acidic (i.e., a pH of less than about 5) and includes metal oxide precursor molecules. The acidic precursor composition typically includes an alumina precursor, a ceria precursor and a zirconia precursor. One or more dopant precursors may also be included in the acidic precursor solution. The acidity of the acidic precursor composition can optionally be adjusted through addition of acid. For example, an acid, such as nitric acid, hydrochloric acid, sulfuric acid, or a mixture thereof, may be added to increase the acidity (i.e., decrease the pH) of the precursor composition. In one embodiment, the acidity of the acidic precursor composition is adjusted prior to its introduction into the reactor by adding acid to the composition.

Alumina precursor molecules include water soluble aluminum compounds known in the art, such as, for example aluminum halide salts, aluminum sulfate salts, aluminum nitrate salts, aluminum alkoxides, as well as mixtures thereof. In some embodiments, the alumina precursor molecules include predominantly aluminum sulfate salts. In some embodiments, at least 50% of the alumina precursor molecules are aluminum sulfate salts. In some embodiments, at least 75% of the alumina precursor molecules are aluminum sulfate salts. In some embodiments, at least 95% of the alumina precursor molecules are aluminum sulfate salts. In some embodiments, the alumina precursor molecules include exclusively aluminum sulfate salts. Suitable ceria precursors include water soluble cerium compounds such as cerous nitrate, ceric nitrate, cerous sulfate, ceric sulfate, and ceric ammonium nitrate, as well as mixtures thereof, such as mixtures of cerous nitrate and ceric nitrate. Suitable water soluble zirconia precursors include water soluble zirconium compounds such as zirconium nitrate, zirconium oxynitrate, zirconium oxychloride, zirconium sulfate, zirconium orthosulfate, zirconium acetate, zirconium lactate, and zirconium ammonium carbonate, as well as mixtures thereof, such as mixtures of zirconium oxynitrate and zirconium sulfate.

Dopant precursors include, for example, water soluble compounds of yttrium (Y), lanthanum (La), neodymium (Nd), praseodymium (Pr), gadolinium (Gd), samarium (Sa), europium (Eu), terbium (Tb), dysprosium (Dy), holmium (Ho), erbium (Er), thulium (Tm), ytterbium (Yb), lutetium (Lu) and scandium (Sc). In some embodiments, the acidic precursor composition includes at least one yttrium precursor, lanthanum precursor, neodymium precursor, praseodymium precursor, gadolinium precursor, or a mixture thereof. Suitable dopant element precursors include, for example, yttrium nitrate, yttrium chloride, yttrium acetate, lanthanum nitrate, lanthanum chloride, lanthanum acetate, neodymium nitrate, neodymium chloride, neodymium acetate, praseodymium nitrate, praseodymium chloride, praseodymium acetate, gadolinium nitrate, gadolinium chloride, gadolinium acetate, and mixtures thereof.

As used herein, the term "basic composition" refers to an aqueous mixture, that is basic (i.e., a pH of greater than about 8). Any base can be used to formulate a basic composition. Suitable bases for forming a basic composition include, but are not limited to alkaline and non-alkaline hydroxide basis, such as sodium hydroxide, potassium hydroxide, calcium hydroxide and magnesium hydroxide, as well as ammonia or ammonium hydroxide, or mixtures thereof. The acidity of the basic composition can optionally be adjusted over a wide range, through addition of acid or base. For example, an acid, such as nitric acid, hydrochloric acid, sulfuric acid, or a mixture thereof, may be added to increase the acidity of the composition or a base, such as sodium hydroxide, potassium hydroxide or a mixture thereof, may be added to decrease the acidity of the composition.

Methods of the present teachings typically occur in an aqueous medium. As referred to herein, an aqueous medium is a medium comprising water and which may optionally further comprise one or more water soluble organic liquids such as for example, lower alkanols, such as methanol, ethanol, propanol and butanol, lower glycols, such as ethylene glycol and propylene glycol, and lower ketones, such as acetone and methyl ethyl ketone.

In some embodiments, the acidic precursor composition and the basic composition are combined at an elevated temperature. For example, in some embodiments, the compositions are combined at a temperature of at least about 40° C., typically at least about 50° C., more typically between about 50° C. and about 200° C.

In some embodiments, the methods further include heating the aqueous solution containing the precipitated materials of aluminum, cerium, zirconium, and optional dopant element hydrates (referred to herein as the "precipitate composition") to a temperature of between about 50° C. and about 200° C. for a period of time of between about 15 minutes and about 6 hours, more typically from about 30 minutes to about 3 hours. For temperatures greater than 100° C., the heating is conducted in a pressure vessel at a pressure of greater than atmospheric pressure. In some embodiments, this heating is performed after stabilizing the precipitate composition. Without wishing to be bound by any particular theory, it is believed that this heating step may increase the pore volume of the resultant oxide, potentially due to the tendency for these precipitates to dissolve and reprecipitate at higher temperatures.

The pH of the suspension of particles in the aqueous medium is then adjusted to a pH of from about 8 to about 10, typically about 8 to about 9, by the introduction of a base to the suspension. The base can be any basic material known to a person of skill in the art. In some embodiments, the base is the basic composition used to form the precipitate composition. The precipitate composition is then typically separated, such that solid materials are isolated from the liquid medium, typically by filtration.

In one embodiment, the particles are washed to remove residues. In one embodiment, prior to isolation of the particles from the aqueous medium, one or more water soluble salts are added to the suspension of particles in the aqueous medium in order to improve washing efficiency. Suitable water soluble salts include, for example, ammonium nitrate, ammonium sulfate, ammonium hydroxide, ammonium carbonate, ammonium bicarbonate, potassium carbonate, sodium carbonate, aluminum bicarbonate, and mixtures thereof. The washing may be conducted using hot water and/or an aqueous solution of a water-soluble ammonium salt such as, for example, ammonium nitrate, ammonium sulfate, ammonium hydroxide, ammonium carbonate, potassium carbonate, sodium carbonate, ammonium bicarbonate, and the like or mixtures thereof. In one embodiment of the washing step, the slurry is dewatered, then washed with an aqueous solution of water-soluble ammonium salt, then dewatered, then washed with water, and then dewatered again to form a wet cake of washed particles. In one embodiment, the wet cake of washed particles is re-dispersed in water to form a second aqueous slurry.

In one embodiment, the second aqueous slurry is then spray dried to particles of aluminum hydrate or metal precursor-contacted aluminum hydrate. In another embodiment, the pH of the second aqueous slurry is adjusted to a pH of from about 4 to about 10, more typically of from about 6 to about 8.5, by the introduction of acid (for example nitric acid, sulfuric acid, or acetic acid) or base (for example sodium hydroxide) to the second aqueous slurry. In one embodiment, the pH adjusted second slurry is then heated to a temperature above ambient temperature, more typically to a temperature of from about 50° C. to about 200° C., even more typically to a temperature of from about 80° C. to about 200° C. for a time period of from about 20 minutes to about 6 hours, more typically from about 30 minutes to about 3 hours. For temperatures greater than 100° C., the heating is conducted in a pressure vessel at a pressure of greater than atmospheric pressure. The particles of the pH adjusted second slurry are then isolated from the aqueous medium of the second slurry. In one embodiment, the particles of isolated from the second slurry are redispersed in water to form a third aqueous slurry and the third aqueous slurry is spray dried.

The isolated (or the isolated, redispersed, and spray dried) particles are then calcined to form an inorganic composite oxide. In one embodiment, the particles are calcined at elevated temperature, typically from 400° to 1100° C., for greater than or equal to about 30 minutes, more typically from about 1 to about 5 hours, to form a porous inorganic composite oxide product. The calcination can be conducted in air, or nitrogen, optionally in the presence of up to about 20% water vapor. In one embodiment, the particles of inorganic oxide are calcined at greater than or equal to 400° C., more typically from about 600 to about 1100° C. for greater than or equal to 1 hour, more typically from about 2 to about 4 hours.

Composite Oxides

In certain embodiments, the present teachings also relate to the inorganic composite oxides prepared using the methods described herein.

Unless otherwise indicated, the relative amounts of the respective oxides of aluminum, cerium, zirconium, and respective dopant elements of the composite oxide composition described herein are each expressed on the basis of the discrete binary oxide of the respective element (for example, for aluminum as $Al_2O_3$, for zirconium as $ZrO_2$, for cerium as $CeO_2$, for yttrium as $Y_2O_3$, for lanthanum as $La_2O_3$, for neodymiun as $Nd_2O_3$, for praseodymium as $Pr_6O_{11}$, and for gadolinium as $Gd_2O_3$). The amount of any given oxide within the composite oxide of the present teachings is typically measured in parts by weight. As used herein to describe the relative amount of a given component of a given composition, the terminology "parts by weight" of the component on the basis of 100 pbw of the given composition is equivalent to a "percent by weight" of the component on the basis of the total weight of the given composition. For example, a reference to 10 pbw of a given component per 100 pbw of a given composition is equivalent in meaning to a reference 10 wt % of the component in the composition.

In one embodiment, the composite oxides of the present teachings include one or more oxides of aluminum in an amount, expressed as pbw $Al_2O_3$ per 100 pbw of the composite oxide, from about 20 to about 96 pbw, typically from about 20 to about 90 pbw, more typically from about 25 to about 80 pbw, and even more typically, from about 30 to about 70 pbw, $Al_2O_3$. The aluminum oxide component of the inorganic oxide described herein may be amorphous or crystalline. In one embodiment, the composite oxide described herein comprises one or more oxides of zirconium, in an amount, expressed as pbw $ZrO_2$ per 100 pbw of the composite oxide, from about 2 to about 80 pbw, more typically from about 5 to about 70 pbw, and even more typically, from about 10 to about 60 pbw, $ZrO_2$. In one embodiment, the composite oxide described herein comprises one or more oxides of cerium, in an amount expressed as pbw $CeO_2$ per 100 pbw of the composite oxide from about 2 to about 80 pbw, more typically from about 5 to about 70 pbw, and even more typically, from about 10 to about 60 pbw, $CeO_2$.

In one embodiment, the composite oxides of the present teachings include one or more oxides of zirconium and cerium, each in an amount expressed as pbw $ZrO_2$ or pbw $CeO_2$ per 100 pbw of the composite oxide of:
from about 20 to about 96 pbw, more typically from about 20 to about 95 pbw, even more typically from about 25 to about 80 pbw $Al_2O_3$,
from about 2 to 78 pbw, more typically from about 5 to 75 pbw, even more typically from about 10 to 70 pbw, and still more typically from about 15 to 60 pbw $ZrO_2$, and
from about 2 to 78 pbw, more typically from about 5 to 75 pbw, even more typically from about 10 to 70 pbw, and still more typically from about 15 to 60 pbw $CeO_2$, provided that the combined amount of $ZrO_2$ and $CeO_2$ does not exceed 80 pbw.

In one embodiment, the composite oxides of the present teachings include oxides of aluminum, cerium and zirconium, and, optionally, oxides of one or more dopants selected from transition metals, rare earths, and mixtures thereof, each in an amount, expressed as pbw of the discrete binary oxide of the respective element per 100 pbw of the composite oxide of:
(a) from about 20 to about 96 pbw more typically from about 20 to about 95 pbw, $Al_2O_3$,
(b) from about 2 to less than 78 pbw, more typically from about 5 to about 75 pbw $ZrO_2$ and from 2 to 78 pbw, more typically from about 5 to about 75 pbw $CeO_2$, provided that the combined amount of $ZrO_2$ and $CeO_2$ does not exceed 80 pbw, and
(c) optionally, up to about 15 pbw of a combined amount of oxides of one or more dopants selected from transition metals, rare earths, and mixtures thereof.

In one embodiment, the composite oxides of the present teachings include oxides of aluminum and lanthanum, wherein, with the amounts of the oxides of aluminum and lanthanum in the composite oxide each expressed as an amount of the discrete binary oxide of the respective element, the amount of $La_2O_3$ is greater than or equal to 2 pbw per 100 pbw of $Al_2O_3$, and the composite oxide exhibits improved aluminum oxide phase stability.

In one embodiment, the composite oxides of the present teachings include oxides of aluminum, zirconium, cerium and yttrium, wherein, with the amounts of the oxides of zirconium, cerium, and yttrium each expressed as an amount of the discrete binary oxide of the respective element, the amount of $Y_2O_3$ is greater than or equal to 2 pbw, per 100 pbw of the combined amount of $ZrO_2$ and $CeO_2$, and the composite oxide exhibits improved zirconium oxide-cerium oxide phase stability.

In one embodiment, the inorganic composite oxides of the present teachings include oxides of Y and La, oxides of Y and Pr, oxides of Y and Nd, oxides of Y and Gd, oxides of La and Pr, oxides of La and Nd, oxides of La and Gd, oxides of Pr and Nd, oxides of Pr and Gd, or oxides of Nd and Gd.

In one embodiment, the inorganic composite oxides of the present teachings include:
oxides of aluminum, zirconium, cerium, Y, and La,
oxides of aluminum, zirconium, cerium, Y, and Pr,
oxides of aluminum, zirconium, cerium, Y, and Nd,
oxides of aluminum, zirconium, cerium, Y, and Gd,
oxides of aluminum, zirconium, cerium, La, and Pr,
oxides of aluminum, zirconium, cerium, La, and Nd,
oxides of aluminum, zirconium, cerium, La, and Gd,
oxides of aluminum, zirconium, cerium, Pr, and Nd,
oxides of aluminum, zirconium, cerium, Pr, and Gd, or
oxides of aluminum, zirconium, cerium, Nd, and Gd.

In one embodiment, the inorganic oxides of the present teachings include oxides of Y, La, and Pr, oxides of Y, La, and Nd, oxides of Y, La, and Gd, oxides of Y, Pr, and Nd, oxides of Y, Pr, and Gd, oxides of Y, Nd, and Gd, oxides of La, Pr, and Nd, oxides of La, Pr, and Gd, oxides of La, Nd, and Gd, or oxides of Pr, Nd, and Gd.

In one embodiment, the inorganic composite oxides of the present teachings include:
oxides of aluminum, zirconium, cerium, Y, La, and Pr,
oxides of aluminum, zirconium, cerium, Y, La, and Nd,
oxides of aluminum, zirconium, cerium, Y, La, and Gd,
oxides of aluminum, zirconium, cerium, Y, Pr, and Nd,
oxides of aluminum, zirconium, cerium, Y, Pr, and Gd,
oxides of aluminum, zirconium, cerium, Y, Nd, and Gd
oxides of aluminum, zirconium, cerium, La, Pr, and Nd
oxides of aluminum, zirconium, cerium, La, Pr, and Gd,
oxides of aluminum, zirconium, cerium, La, Nd, and Gd, or
oxides of aluminum, zirconium, cerium, Pr, Nd, and Gd.

In one embodiment, the composite oxides of the present teachings include oxides of aluminum, zirconium, cerium and yttrium and lanthanum and/or neodymium and/or praseodymiun, wherein, with the amounts of oxides of zirconium, cerium, and the respective dopant elements each expressed as an amount of the discrete binary oxide of the respective element:
the combined amount of $La_2O_3$, $Nd_2O_3$, and/or $Pr_6O_{11}$ is greater than or equal to 2 pbw per 100 pbw of $Al_2O_3$, and
the amount of $Y_2O_3$ is greater than or equal to 2 pbw per 100 pbw of the combined amount of $ZrO_2$ and $CeO_2$, and
the composite oxide exhibits improved aluminum oxide phase stability and improved zirconium oxide-cerium oxide phase stability.

In one embodiment, the amount of oxides of one or more dopant elements in the inorganic composite oxide of the present teachings, expressed as pbw of the combined amount of the discrete binary oxides of the respective dopant elements per 100 pbw of the composite oxide, is from greater than 0 to about 15 pbw, more typically from about 1 to 12 pbw, and even more typically, from about 2 to 10 pbw of the oxides of one or more dopant elements.

In one embodiment, the relative amounts of the component elements of the oxides of the inorganic composite oxide formula are, expressed as binary oxides of the respective elements, according to structure (I):

$$(Al_2O_3)_a(CeO_2)_b(ZrO_2)_c(M_xO_y)_d(M'_{x'}O_{y'})_e(M''_{x''}O_{y''})_f \quad (I)$$

wherein:
each of $M_xO_y$, $M'_{x'}O_{y'}$, $M''_{x''}O_{y''}$ is a binary oxide independently selected from $Y_2O_3$, $La_2O_3$, $Nd_2O_3$, $Pr_6O_{11}$, $Gd_2O_3$; and coefficients a, b, c, d, e, and f reflect the respective molar amounts of the respective binary oxides, wherein:

$35 \leq a \leq 97$,
$0 \leq b \leq 50$,
$0 \leq c \leq 60$,
$0 \leq d \leq 14$,
$0 \leq e \leq 14$, and
$0 \leq f \leq 14$, provided that:

no two of M, M', and M" are the same element, and the sum of d+e+f is less than or equal to 14.

In one embodiment, oxides of aluminum and optionally one or more dopant elements form a first single crystallographic phase and the oxides of zirconium and cerium and optionally of one or more dopant elements form a second crystallographic phase. In one embodiment, the inorganic oxide described herein comprises a porous alumina structure comprising aluminum oxides and, optionally, oxides of one or more associated dopant elements, and having a surface area, and structures, typically nanoparticles, comprising zirconium and cerium oxides, and, optionally, oxides of one or more associated dopant elements, supported on the surface of the porous alumina structure. In some embodiments, the surface area of the porous alumina structure includes an outer surface area and an internal surface area accessible through the pores of the porous structure, and the structures (e.g., nanoparticles) are distributed substantially evenly over the outer surface area and accessible internal surface area of the porous alumina structure. In some embodiments, the surface area of the porous alumina structure includes an outer surface area and an internal surface area accessible through the pores of the porous structure, and the structures (e.g., nanoparticles) are distributed more densely over the outer surface area of the aluminum oxide support structure than over the internal surface area of the aluminum oxide support structure.

In some embodiments, the inorganic composite oxide, after calcining at 900° C. for 2 hours, a BET surface area of at least about 50 m$^2$/g, typically at least about 60 m$^2$/g, more typically at least about 70 m$^2$/g. In some embodiments, the inorganic composite oxide, after aging at 1100° C. for 5 hours, a surface area of at least about 25 m$^2$/g, typically at least about 27.5 m$^2$/g, more typically at least about 30 m$^2$/g. In some embodiments, the inorganic composite oxide, after aging at 1200° C. for 5 hours, a surface area of at least about 10 m$^2$/g, typically at least about 12.5 m$^2$/g, more typically at least about 15 m$^2$/g. BET specific surface area is measured using a nitrogen adsorption technique.

In some embodiments, the inorganic composite oxide, after calcining at 900° C. for 2 hours, a pore volume of at least about 0.30 cm$^3$/g, typically at least about 0.40 cm$^3$/g, more typically at least about 0.45 cm$^3$/g. Pore volume is measured using nitrogen adsorption through a Barret-Joyner-Halenda (BJH) method.

In some embodiments, crystallites of ceria-zirconia on the surface of the alumina support have, after calcining at 900° C. for 2 hours, a crystallite size of less than about 15 nm, typically less than about 10 nm, more typically less than about 5 nm. In some embodiments, crystallites of ceria-zirconia on the surface of the alumina support have, after aging at 1100° C. for 5 hours, a crystallite size of less than about 25 nm, typically less than about 20 nm, more typically less than about 15 nm. Crystallite size is measured via XRD line broadening.

In some embodiments, the inorganic composite oxides described herein have excellent ceria-zirconia phase stability. That is, in some embodiments, the inorganic composite oxide exhibits minimal ceria-zirconia phase separation upon prolonged aging at high temperature. In some embodiments, the inorganic composite oxide exhibits minimal ceria-zirconia phase separation after aging at 1100° C. for 5 hours. In some embodiments, the inorganic composite oxide exhibits minimal ceria-zirconia phase separation after aging at 1200° C. for 5 hours. Phase separation can be identified, for example, by observing peak splitting in the X-Ray Diffraction (XRD) spectrum.

A person of ordinary skill in the art would appreciate that conventional means for differentiating inorganic composite oxides may be inadequate to differentiate one sample from another. That is, the same ingredients are capable of producing two different composite oxides having, for example, the same or very similar surface area, pore volume and crystallite size. In such cases, the two composite oxides can be differentiated by their function. Accordingly, in some embodiments, the inorganic composite oxides of the present teachings exhibit superior properties as measured by Temperature Programmed Reduction (TPR). The properties discussed below are measured after calcination (e.g., at 900° C. for 2 hours) but before extended aging.

In some embodiments, the inorganic composite oxides of the present teachings exhibit a lower maximum reducibility temperature, as compared to an inorganic composite oxide having the same absolute formulation, but prepared by conventional means. As used herein, the term "maximum reducibility temperature" refers to the temperature at which the uptake of hydrogen is maximal (and thus the temperature at which the reduction of cerium IV to cerium III is maximal), as measured by TPR. TPR measures hydrogen consumption as a function of the temperature and this measurement allows the deduction of the temperature at which the degree of cerium reduction is also maximal. The maximum reducibility temperature is reflected by a peak on the TPR curve. In some embodiments, the inorganic composite oxides of the present teachings exhibit, after calcination at 900° C. for 2 hours, a maximum reducibility temperature of less than about 570° C., typically less than about 555° C., more typically less than about 540° C., as measured by TPR with a 10° C./min temperature rise in a 30 mL/minute flow of 10% H$_2$ in argon.

In some embodiments, the inorganic composite oxides of the present teachings exhibit a lower reducibility onset temperature, as compared to an inorganic composite oxide having the same absolute formulation, but prepared by conventional means. As used herein, the term "reducibility onset temperature" refers to the first temperature at which the uptake of hydrogen is measurable (and thus the first temperature at which the reduction of cerium IV to cerium III is measurable). In some embodiments, the inorganic composite oxides of the present teachings exhibit, after calcination at 900° C. for 2 hours, an onset of ceria reducibility at a temperature of less than about 300° C., typically less than about 270° C., more typically less than about 220° C., as measured by TPR with a 10° C./min temperature rise in a 30 mL/minute flow of 10% H$_2$ in argon.

In some embodiments, the inorganic composite oxides of the present teachings exhibit a half-maximal TPR width measurement that is less than half the comparable measurement of an inorganic composite oxide having the same absolute formulation, but prepared by conventional means. Without wishing to be bound by any particular theory, it is believed that a peak with a narrower distribution (i.e., a "thinner" peak) is evidence of a more homogeneous ceria-zirconia phase with a more uniform distribution on the surface of the alumina support. In some embodiments, the inorganic composite oxide exhibits, after calcination at 900° C. for 2 hours, a half-maximal TPR width measurement of less than about 75° C., typically less than about 70° C., more typically less than about 65° C., even more typically less than about 60° C., as measured by TPR with a 10° C./min temperature rise in a 30 mL/minute flow of 10% $H_2$ in argon. In some embodiments, the inorganic composite oxide exhibits, after calcination at 900° C. for 2 hours, a half-maximal TPR width measurement of less than about 55° C., as measured by TPR with a 10° C./min temperature rise in a 30 mL/minute flow of 10% $H_2$ in argon. In still other embodiments, the inorganic composite oxide exhibits, after calcination at 900° C. for 2 hours, a half-maximal TPR width measurement of less than about 50° C., as measured by TPR with a 10° C./min temperature rise in a 30 mL/minute flow of 10% $H_2$ in argon.

In some embodiments, the inorganic composite oxides of the present teachings exhibit higher absolute ceria reducibility than an inorganic composite oxide having the same absolute formulation, but prepared by conventional means (e.g., sequential precipitation). As used herein, the term "absolute ceria reducibility" refers to the total amount of ceria reduced, as measured by the area under the TPR curve. In some embodiments, the inorganic composite oxides of the present teachings exhibit, after calcination at 900° C. for 2 hours, an absolute ceria reducibility of at least about 75%, typically at least about 80%, e.g., at least about 85%, as measured by TPR with a 10° C./min temperature rise in a 30 mL/minute flow of 10% $H_2$ in argon.

Catalysts

The porous inorganic composite oxide of the present teachings, especially when in the form of a powder of from 1 to 200 μm, more typically from 10 to 100 μm, can be further used as a catalytic coating on a low surface area substrate. The substrate structure can be chosen from a variety of forms for a particular application. Such structural forms include monoliths, honeycomb, wire mesh and the like. The substrate structure is normally formed of a refractory material such as, for example, alumina, silica-alumina, silica-magnesia-alumina, zirconia, mullite, cordierite, as well as wire mesh and the like. Metallic honeycomb substrates can also be used. In some embodiments, the powder inorganic composite oxide is slurried in water, peptized by the addition of a small amount of acid (typically mineral acids), and then subjected to milling to cause a reduction in particle size suitable for washcoating application. The substrate structure is contacted with the milled slurry, such as by dipping the substrate into the slurry. The excess material is removed, such as by application of blown air, followed by calcining the coated substrate structure to cause adhesion of the (wash-coat) inorganic composite oxide particulates described above to the substrate structure.

Noble metals, usually the metals of the platinum group, such as platinum, palladium, rhodium and mixtures thereof, can be applied in manners well known to those skilled in this art, either before wash-coating the particulate inorganic composite oxide using a suitable conventional noble metal precursor (acidic or basic), or after washcoating by dipping the washcoated substrate in a suitable noble-metal precursor solution (either acidic or basic). More typically the porous inorganic composite oxide is formed, followed by application of the noble metal thereto, and finally, wash-coating the inorganic composite oxide supported catalyst material onto a substrate. The porous inorganic composite oxide described herein may also be mixed with one or more other oxide supports (including, but not limited to alumina, magnesia, ceria, ceria-zirconia, rare-earth oxide-zirconia mixtures) and then wash-coated with these products onto a substrate.

The resultant catalyst can be directly loaded into canisters and the like either alone or in combination with other materials as part of the exhaust emission system of an internal combustion engine. Thus, the exhaust products, which normally comprise oxygen, carbon monoxide, carbon dioxide, hydrocarbons, nitrogen oxides, sulfur, sulfurous compounds and sulfur oxides, are passed through the exhaust system to provide contact with the noble-metal supported catalyst. The result provides conversion of the noxious and harmful exhaust products into more environmentally acceptable materials.

The present teachings are also directed to a method for treating an exhaust gas from an internal combustion engine using the catalyst described herein. The method generally includes contacting the exhaust gas with the catalyst such that the exhaust gas is treated (e.g., such that the amount of unburnt hydrocarbons, CO, $NO_x$, and/or sulfurous compounds in the exhaust gas is decreased). In some embodiments, CO, NOx, unburnt hydrocarbon, or any combination thereof, from the exhaust gas is eliminated.

It is to be understood that any range of numbers recited in the specification or claims, such as representing a particular set of properties, units of measure, conditions, physical states or percentages, is intended to literally incorporate expressly herein by reference or otherwise, any number falling within such range, including any subset of numbers within any range so recited.

The following examples are given as specific illustration of the claimed invention. It should be understood, however, that the invention is not limited to the specific details set forth in the examples. All parts and percentages in the examples and in the remainder of the specification are by weight unless otherwise specified.

EXEMPLIFICATION

Analytical results for the compositions of Examples 1-8 are reported in TABLES 1A, 1B and 1C, below. For example, depending upon the sample, TABLES 1A-1C provide pore volume after calcination at 900° C. for 2 hr (PV 900C (cc/g)), surface area after calcination at 900° C. for 2 hr (SA 900C (m2/g)), oxide crystallite size after calcination at 900° C. for 2 hr (X-size 900C (nm)), surface area after calcination at 1100° C. for 5 hr (SA 1100C (m2/g)), oxide crystallite size after calcination at 1100° C. for 5 hr (X-size 1100C (nm)) and surface area after calcination at 1200° C. for 5 hr (SA 1200C (m2/g)). Pore volume and BET specific surface areas were determined by Nitrogen adsorption techniques using a Micromeretics Tristar 3000 apparatus. Pore volume data were collected using 91 measurement points between P/P0=0.01 and P/P0=0.998. Specific Surface Areas (SA) are reported in square meters per gram (m²/g), Pore Volumes are reported in cubic centimeters per gram (cc/g), calcination temperatures are reported in degrees Centigrade (° C.) and times are reported in hours (hr). Unless otherwise specified, the calcinations referred to in the various Examples were conducted in air.

Where applicable, TPR measurements are obtained using a temperature-programmed desorption analyzer under the following measurement conditions: carrier gas: 90% argon-10% hydrogen; gas flow rate: 30 mL/min; rate of sample temperature increase during measurements: 10° C./min.

Example 1

The composite oxide of Example 1 contained $Al_2O_3$, $CeO_2$, $ZrO_2$, $La_2O_3$ and $Y_2O_3$. An acidic precursor composition (Solution A) was made by mixing together an aluminum sulfate solution, a cerium nitrate solution, a zirconium oxynitrate solution, a lanthanum nitrate solution, and a yttrium nitrate solution to provide a composition having a total oxide basis of 50 grams of final material.

A basic composition (Solution B) was made by mixing ammonia and water to form approximately 700 mL of a 5.3N solution of $NH_4OH$.

Approximately 120 g deionized water was added to a heated 1 liter reactor equipped with an agitator. The temperature in the reactor was maintained at 65° C. from the beginning of the precipitation to filtration. Solutions A and B were simultaneously introduced into the reactor, under agitation, at respective flow rates of approximately 4.8 mL/min and approximately 4.0 mL/min. After an initial ramp, the pH stabilized at approximately 5.5. The flow rates of Solutions A and B were maintained at approximately 4.8 mL/min and approximately 4.0 mL/min, respectively, until all of Solution A was utilized, approximately 60 minutes. At this point, the flow rate of Solution B was increased to approximately 9.8 mL/min until the pH reached a value of approximately 8.7, approximately 20 minutes. The aqueous mixture containing the stabilized precipitate was divided in half.

Half of the aqueous mixture was then filtered at 60° C. in a Buchner funnel to form a wet filter cake. The wet filter cake was washed with deionized water at the same volume as the aqueous medium in the reactor and at 60° C. The wet filter cake was then washed with the same volume of an ammonium bicarbonate solution, prepared by dissolving 30 grams of ammonium bicarbonate per liter of deionized water at 60° C. The wet filter cake was then washed with two volumes of deionized water at 60° C. The resulting wet filter cake was then dispersed in deionized water to form a slurry containing about 10 wt % of solids. The slurry was spray dried to obtain a dried powder. The spray dried powder was then calcined at 900° C. for 2 hours and characterized. After calcination at 900° C. for 2 hours, the composite oxide was then calcined at higher temperatures for further characterization. Analytical data for this sample is denoted "pH 5.5."

Figure 1:
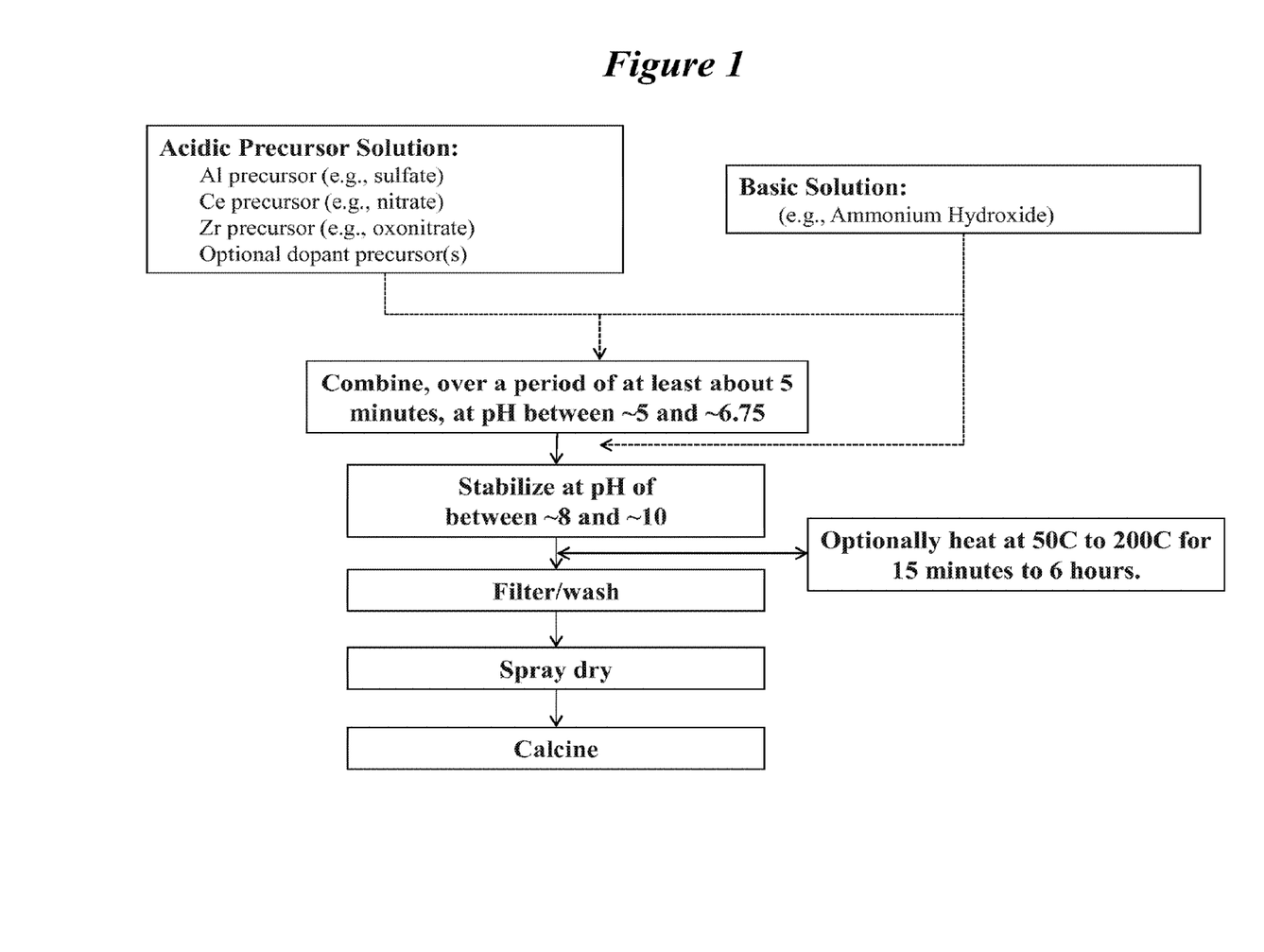
FIG. 1 is a flow diagram representing an exemplary method for forming materials of the present teachings.
Figure 2:
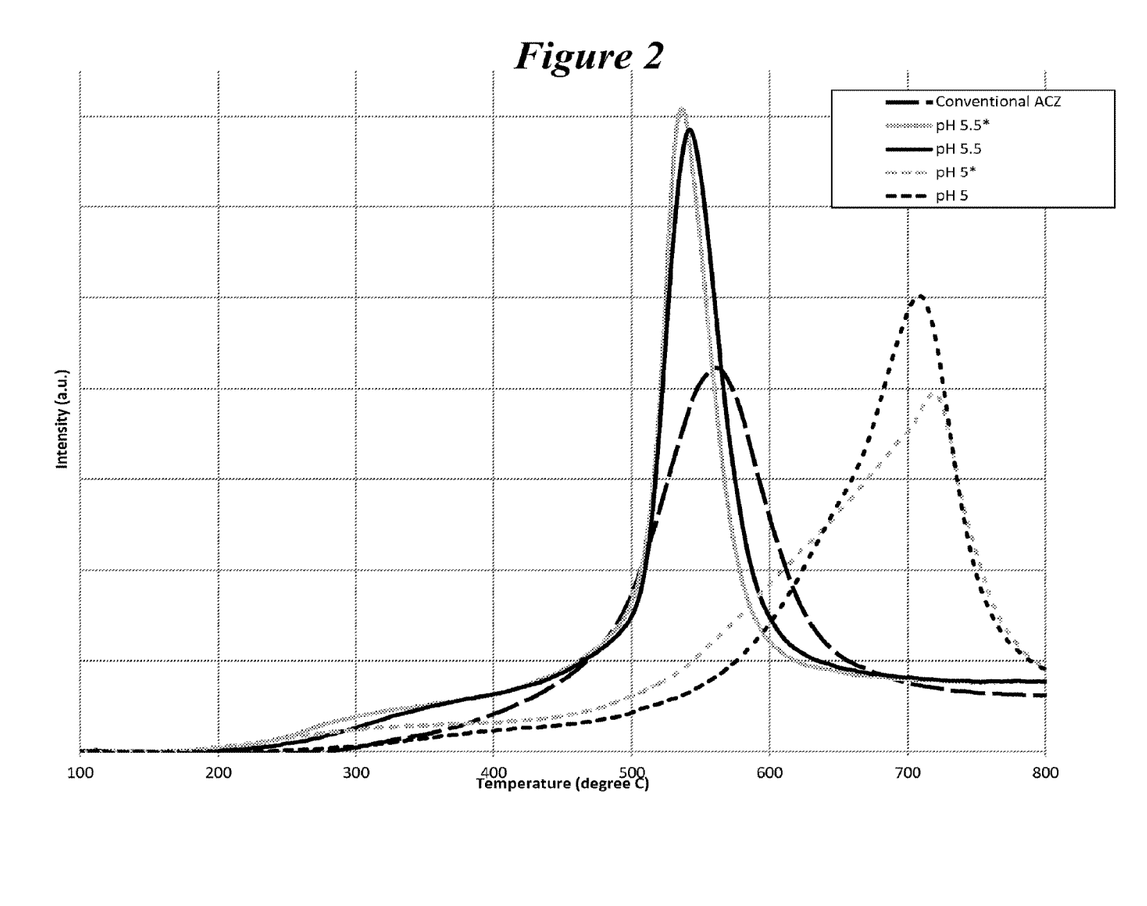
FIG. 2 is a graph depicting Temperature-Programmed Reduction (TPR) plots for exemplary inorganic composite oxides of the present teachings.

The second half of the aqueous mixture containing the stabilized precipitate was heated at a temperature of approximately 95° C. for 2 hours, then filtered, washed, spray dried, and calcined as described above. Analytical data for this sample is denoted "pH 5.5*." TPR measurements of the pH 5.5 and the pH 5.5* samples after calcination at 900° C. for 2 hours are shown in FIG. 1 as compared to a conventional sample prepared by sequential precipitation (e.g., in accordance with PCT Publication No. WO 2012/067654).

Example 2

The composite oxide of Example 2 contained $Al_2O_3$, $CeO_2$, $ZrO_2$, $La_2O_3$ and $Y_2O_3$. This composite oxide was prepared in the same manner as Example 1, except that the flow rates of Solutions A and B are adjusted such that the pH is maintained at 4.0 during their combination. Analytical data for these samples are denoted "pH 4.0" and "pH 4.0*."

Example 3

The composite oxide of Example 3 contained $Al_2O_3$, $CeO_2$, $ZrO_2$, $La_2O_3$ and $Y_2O_3$. This composite oxide was prepared in the same manner as Example 1, except that the flow rates of Solutions A and B are adjusted such that the pH is maintained at 5.0 during their combination. Analytical data for these samples are denoted "pH 5.0" and "pH 5.0*."

TPR measurements of the pH 5.0 and the pH 5.0* samples after calcination at 900° C. for 2 hours are also shown in FIG. 1.

Example 4

The composite oxide of Example 4 contained $Al_2O_3$, $CeO_2$, $ZrO_2$, $La_2O_3$ and $Y_2O_3$. This composite oxide was prepared in the same manner as Example 1, except that the flow rates of Solutions A and B are adjusted such that the pH is maintained at 6.0 during their combination. Analytical data for these samples are denoted "pH 6.0" and "pH 6.0*."

Example 5

The composite oxide of Example 5 contained $Al_2O_3$, $CeO_2$, $ZrO_2$, $La_2O_3$ and $Y_2O_3$. This composite oxide was prepared in the same manner as Example 1, except that the flow rates of Solutions A and B are adjusted such that the pH is maintained at 6.5 during their combination. Analytical data for these samples are denoted "pH 6.5" and "pH 6.5*."

Example 6

The composite oxide of Example 6 contained $Al_2O_3$, $CeO_2$, $ZrO_2$, $La_2O_3$ and $Y_2O_3$. This composite oxide was prepared in the same manner as Example 1, except that the flow rates of Solutions A and B are adjusted such that the pH is maintained at 7.0 during their combination. Analytical data for these samples are denoted "pH 7.0" and "pH 7.0*."

Comparative Example 7

The composite oxide of Example 7 contained $Al_2O_3$, $CeO_2$, $ZrO_2$, $La_2O_3$ and $Y_2O_3$. This composite oxide was prepared in the same manner as Example 1, except that the basic Solution B was added into acidic precursor solution A directly to increase the pH gradually to 8.8 during their combination. Analytical data for these samples are denoted "variable pH" and "variable pH*."

Example 8

The composite oxide of Example 8 contained $Al_2O_3$, $CeO_2$, $ZrO_2$, $La_2O_3$ and $Y_2O_3$. This composite oxide was prepared in the same manner as Example 1, except that the temperature for the entire precipitation process was maintained at 40° C., rather than 65° C. Analytical data for these samples are denoted "pH 5.5-40° C." and "pH 5.5-40° C.*."

Table 1A

|  | pH | | | | | |
| --- | --- | --- | --- | --- | --- | --- |
|  | pH 4.0 | pH 4.0* | pH 5.0 | pH 5.0* | pH 5.5 | pH 5.5* |
| SA-900C (m2/g) | 51 | 41 | 15 | 33 | 65 | 71 |
| PV-900C (cc/g) | 0.16 | 0.28 | 0.13 | 0.21 | 0.30 | 0.45 |
| X-size 900C (nm) | 4.9 | 5.4 | 5.0 | 5.8 | 4.7 | 5.4 |
| SA-1100C (m2/g) | 7 | 19 | 4 | 14 | 20 | 30 |
| X-size 1100C (nm) | 13.9 | 16.5 | 12.9 | 16.5 | 11.6 | 15.8 |
| SA-1200C (m2/g) | 4 | 9 | 2 | 8 | 11 | 14 |

-continued

Table 1B

| | pH | | | | | |
|---|---|---|---|---|---|---|
| | pH 6.0 | pH 6.0* | pH 6.5 | pH 6.5* | pH 7.0 | pH 7.0* |
| SA-900C (m2/g) | 63 | 75 | 72 | 86 | 48 | 53 |
| PV-900C (cc/g) | 0.27 | 0.56 | 0.36 | 0.52 | 0.28 | 0.31 |
| X-size 900C (nm) | 4.8 | 5.4 | 4.7 | 5.2 | 7.3 | 7.0 |
| SA-1100C (m2/g) | 21 | 30 | 25 | 35 | 16 | 14 |
| X-size 1100C (nm) | 12.7 | 15.1 | 12.5 | 14.7 | 21.2 | 21.7 |
| SA-1200C (m2/g) | 12 | 15 | 14 | 17 | 3 | 1 |

Table 1C

| | pH | | | |
|---|---|---|---|---|
| | pH 5.5-40° C. | pH 5.5-40° C.* | Variable | Variable* |
| SA-900C (m2/g) | 19 | 30 | 52 | 64 |
| PV-900C (cc/g) | 0.11 | 0.19 | 0.18 | 0.47 |
| X-size 900C (nm) | 4.8 | 5.0 | 5.0 | 6.7 |
| SA-1100C (m2/g) | 3 | 13 | 11 | 26 |
| X-size 1100C (nm) | 11.6 | 12.5 | 13.2 | 13.5 |
| SA-1200C (m2/g) | 3 | 9 | 6 | 14 |

Note that the * indicates the additional heating step during preparation of the composite oxide.

We claim:

1. A method for forming an inorganic composite oxide, the method comprising:
combining, at a substantially constant pH of between about 5 and about 6.75 over a period of at least about 5 minutes, an acidic precursor composition and a basic composition to form a precipitate composition, wherein the acidic precursor composition comprises an alumina precursor, a ceria precursor, a zirconia precursor and optionally one or more dopant precursors;
stabilizing the precipitate by increasing the pH of the precipitate composition to between about 8 and about 10; and
calcining the stabilized precipitate to form an inorganic composite oxide.

2. The method according to claim 1, wherein the substantially constant pH is maintained by (a) controlling a flow rate of the acidic precursor composition, the basic composition or both or (b) controlling a concentration of the acidic precursor composition, the basic composition or both or (c) controlling a flow rate and a concentration of the acidic precursor composition, the basic composition or both.

3. The method according to claim 1, wherein the acidic precursor composition and the basic composition are combined at a substantially constant pH of between about 5.5 and about 6.5 over a period of between about 30 and about 90 minutes.

4. The method according to claim 1, wherein the acidic precursor composition and the basic composition are combined at a substantially constant pH of about 6.5 over a period of between about 30 and about 90 minutes.

5. The method according to claim 1, wherein the pH of the precipitate composition in the combining step does not vary by more than about 0.25.

6. The method according to claim 1, wherein the pH of the precipitate composition in the combining step does not vary by more than about 0.1.

7. The method according to claim 1, wherein the acidic precursor composition and the basic composition are combined at a temperature of between about 50° C. and about 200° C.

8. The method according to claim 1, wherein the precipitate is stabilized by increasing the pH of the precipitate composition to between about 8 and about 9.

9. The method according to claim 1, further comprising heating the precipitate composition to a temperature of between about 50° C. and about 200° C. for a period of time of between about 15 minutes and about 6 hours.

10. The method according to claim 1, wherein the precipitate is calcined at a temperature between about 600 and about 1100° C. for a time period of between about 2 and about 4 hours.

11. The method according to claim 1, wherein the precursor composition comprises one or more dopant precursors selected from yttrium precursor, lanthanum precursor, neodymium precursor, praseodymium precursor, gadolinium precursor, or mixtures thereof.

12. The method according to claim 1, wherein the inorganic composite oxide has, after calcining at 900° C. for 2 hours, a BET surface area of at least about 70 m²/g, a pore volume of at least about 0.45 cm³/g, or both.

13. The method according to claim 1, wherein the inorganic composite oxide, after aging at 1200° C. for 5 hours, exhibits minimal ceria-zirconia phase separation as measured by the absence of peak splitting in XRD.

14. The method according to claim 1, wherein the inorganic composite oxide has, after aging at 1100° C. for 5 hours, a surface area of at least about 30 m²/g, ceria-zirconia crystallites with a crystallite size of less than about 16 nm, or both.

15. The method according to claim 1, wherein the inorganic composite oxide exhibits, after calcination at 900° C. for 2 hours, a maximum reducibility temperature of less than about 570° C., as measured by TPR with a 10° C./min temperature rise in a 30 mL/minute flow of 10% $H_2$ in argon.

16. The method according to claim 1, wherein the inorganic composite oxide exhibits, after calcination at 900° C. for 2 hours, an onset of ceria reducibility at a temperature of less than about 300° C., as measured by TPR with a 10° C./min temperature rise in a 30 mL/minute flow of 10% $H_2$ in argon.

17. The method according to claim 1, wherein the inorganic composite oxide exhibits, after calcination at 900° C. for 2 hours, a half-maximal TPR width measurement of less than about 75° C., as measured by TPR with a 10° C./min temperature rise in a 30 mL/minute flow of 10% $H_2$ in argon.

18. The method according to claim 1, wherein the inorganic composite oxide exhibits, after calcination at 900° C. for 2 hours, an absolute ceria reducibility of at least about 75%, as measured by TPR with a 10° C./min temperature rise in a 30 mL/minute flow of 10% $H_2$ in argon.

19. The method according to claim 1, wherein the inorganic composite oxide exhibits, after calcination at 900° C. for 2 hours, an absolute ceria reducibility of at least about 85%, as measured by TPR with a 10° C./min temperature rise in a 30 mL/minute flow of 10% $H_2$ in argon.

* * * * *